United States Patent [19]
Cuvelier et al.

[11] 3,778,225

[45] Dec. 11, 1973

[54] REACTIVE DYEING OF EPOXY ALKYL QUATERNARY AMMONIUM CELLULOSE OR POLYVINYL ALCOHOL TEXTILES

[75] Inventors: Georges Cuvelier, Sotteville-les-Rouen; Daniel Wattiez, Saint-Etienne-Durouvray, both of France

[73] Assignee: Institut Textile de France, Boulogne-sur-Siene, France

[22] Filed: June 26, 1972

[21] Appl. No.: 266,330

[30] Foreign Application Priority Data
Aug. 30, 1968 France .............................. 68164694

[52] U.S. Cl. ................................ 8/31, 8/1 E, 8/17, 8/100
[51] Int. Cl. ............................................. D06p 1/38
[58] Field of Search .................... 8/31, 100, 1 A, 17

[56] References Cited
UNITED STATES PATENTS

| | | | |
|---|---|---|---|
| 2,136,928 | 11/1938 | Schlack | 8/100 X |
| 2,183,754 | 12/1939 | Schlack | 8/100 |
| 2,238,949 | 4/1941 | Schlack | 8/100 |
| 2,762,718 | 9/1956 | Kleiner | 117/63 |
| 3,685,953 | 8/1972 | Cuvelier et al. | 8/11 |

*Primary Examiner*—Donald Levy
*Attorney*—George F. Dvorak et al.

[57] ABSTRACT

Fibers of hydroxylised polymers are modified by replacing hydroxyl groups thereof with quaternary ammonium groups and then dyed with a fiber-reactive dye. Included in the modification of the fibers is an impregnation of the hydroxylised polymers with an aqueous solution containing epoxypropyl ammonium salts or precursors thereof.

2 Claims, No Drawings

REACTIVE DYEING OF EPOXY ALKYL QUATERNARY AMMONIUM CELLULOSE OR POLYVINYL ALCOHOL TEXTILES

This is a division of application Ser. No. 853,543, filed Aug. 27, 1969 now U.S. Pat. No. 3,685,953.

The present invention relates to polyhydroxylised polymers, such as cellulose or insolubilised polyvinyl alcohol, bearing quaternary ammonium functional groups and having improved dyeing properties, and to a both simple and economic process for obtaining these polymers.

It is known that the fixation of functional groups with a basic character, such as amine groups, on polyhydroxylated polymer fibers such as cellulose or cellulose derivative fibers confers special properties on the fibers, including a considerable modification of their dyeing affinity. Numerous processes have been tried and have not lead to an industrial application because of certain disadvantages, such as the deterioration of the treated products, the high cost of the treatment, due either to the price of the products themselves, or to poor useful yields, or even to the complexity of the method used.

The invention provides a process for treating a hydroxylised polymer usually of a textile nature to modify its dyeing properties, particularly its affinity to fiber-reactive dyes, wherein: the hydroxylised polymer is impregnated with an aqueous solution comprising an epoxypropyl ammonium salt of formula

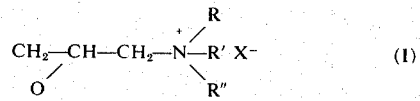

where R, R' and R'' are lower alkyl radicals and X⁻ is an anion, for example sulphate, sulphonate and halide, and a strong base as fixation catalyst, particularly alkaline metal hydroxides such as potassium and sodium hydroxides, at a concentration of 0.5 to 10 percent by weight, preferably 0.5 to 4 percent by weight; excess water is removed from the impregnated polymer; the polymer is dried at 80 to 140°C, preferably 120°C; and the polymer is rinsed with water. In practice the concentration of the epoxypropyl ammonium salt in the aqueous solution corresponds to the content of nitrogen required in the final treated polymer.

The reaction can be written as follows:

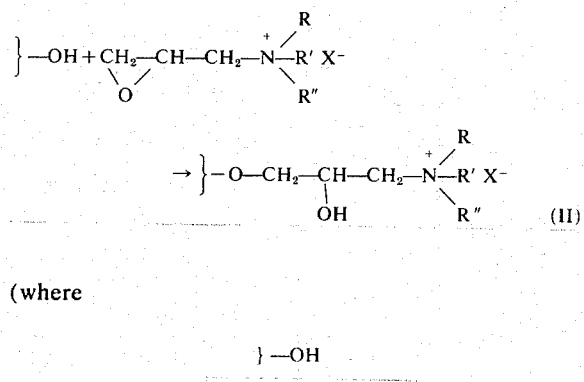

(where $$\}-OH$$

represents the polyhydroxylised polymer), formula (II) being that of a polyhydroxylised polymer bearing quaternary ammonium groups, according to the invention.

Instead of using an epoxypropyl ammonium salt of formula (I) directly, a precursor compound of the salt, for example the corresponding chlorohydrin can also be used.

The mode of treatment is generally as follows:

A textile material to be treated is impregnated with an aqueous solution of the quaternary ammonium salt, at a concentration corresponding to the content of nitrogen requisite for the final product, taking into account the yield and the rate of removal of excess water; the fixation reaction is catalysed by strong bases, particularly alkaline metal hydroxides, such as sodium hydroxide and potassium hydroxide, at the relatively low concentration of 0.5 to 10 percent by weight, preferably of about 0.5 to 4 percent, in the aqueous solution. The impregnated material is squeezed out to a retention as low as possible (generally 90 percent), then dried in a ventilated atmosphere at 80° – 140°C, preferably 120°C. Continuing this heat treatment a few minutes after complete dryness is often favorable to terminate the fixation reaction. A rinse with water is then sufficient to eliminate any catalyst remaining on the treated textile material.

No important result is obtained with a concentration of strong base lower than 0.5 percent. No additional advantage is obtained with a concentration of strong base greater than 4 percent. With a concentration of strong base greater than 10 percent, the hydroxylised polymer deteriorates and in the case of sodium hydroxide alkali - cellulose is formed. In addition, at a temperature lower than 80° a poor yield is obtained and at a temperature higher than 120° no additional advantage is obtained.

Furthermore, in the chosen treatment conditions, there is obtained for amounts of fixed nitrogen varying from 0.1 to 0.5 percent, reproducible fixation yields varying from 60 to 85 percent in relation to the deposited active product. This is at least unexpected, because with epoxyamines, which are related compounds, a treatment in the conditions according to the invention has only given low fixation yields. In this sphere, it has been possible to establish the following facts.

a. In a general way, the fixation yields are always better for small amounts of fixed nitrogen.

b. The yield increases when the amount of excess water removed from the treated material decreases.

c. The best yields were obtained in the scale of products tried, with products of the general formula:

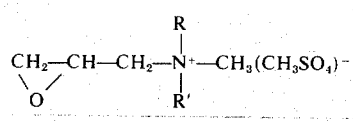

where R and R' are alkyl chains having two or more carbon atoms.

When the three substituents R, R' and R'' are identical, a heat treatment which is too long can cause a loss of nitrogen and a drop in yield by destruction of the quaternary ammonium, for example, when the three substituents are methyl groups trimethylamine may be liberated.

The textile material thus treated can then be transformed into spinnable soluble derivatives either in the form of acetate or in the form of xanthate in the case of cellulose.

For polvinyl alcohol, the treatment can be envisaged:

either on already insolubilised fibers cold by thermal pretreatment;

or again on the final products acetalysed at the handling stage.

The products treated in accordance with the invention exhibit a considerable improvement in their dyeing affinity, and this starting from an amount of nitrogen of 0.1 percent. Particularly, such an improvement is manifested by:

1st) A cold fixation until exhaustion of the bath of acidyes for wool, as well as metalliferous 2/1 complex dyes.

2nd) A very appreciable increase of the affinity for direct dyes with improvement of fastness to water and to neutral or weakly alkaline washing.

3rd) A great increase of the affinity for dyes of the soluble phthalocyanine type (for example Pandurane of Durand-Huguenin) and sulphuric esters of vat dyes of the Indigosol type.

4th) A medium increase of the affinity for vat dyes and naphthols.

5th) A fixation of fiber-reactive dyes of the type derived from chlorinated phthalocyanine or the like in a neutral bath, with a better yield and better exhaustion of the bath.

For cotton threads and fabrics, this treatment allows the great improvement of the finish of articles containing numerous "buttons" resulting from a low ripeness of the cotton used.

As for the spinnable soluble derivatives of these polyhydroxylised polymers, such as cellulose triacetate, dyeing and printing with the different types of dyes cited above becomes possible, but a vehicle which allows accessibility of the polymer structure to the dye giving it a certain enlargement should be added to the dyeing bath solution.

Fibers and films of triacetate and secondary acetate of cellulose can also be dyed, after enlargement treatment, for example, by soaking in a mixture 50/50 by volume of water and acetone, by a large number of dye categories such as direct dyes, fibro-reactive dyes, acid dyes, metalliferous 2/1 complexes for wool, dyes of the soluble phthalocyanine type and dyes which are diazotizable on fiber. Furthermore, the affinity for plastosoluble dyes is increased in many cases. This is also applicable to the other spinnable or film-forming derivatives of the polyalcohols, such as esters or ethers.

According to a variant of the invention an aqueous paste comprising a non-hydroxylised thickener (for example oil, trimethyl cellulose, or sodium or potassium polyacrylate), 0.5 to 4 percent of a strong mineral base such as sodium hydroxide and a quaternary ammonium salt of formula (I) is applied to an area of a hydroxylised fabric, and then the fabric is subjected to heat treatment at about 100° to 120°C conveniently by hot air and preferably for 5 to 10 minutes. The fabric may be printed locally or coated on one side with the aqueous paste. After washing a locally modified fabric is obtained. Dyeing the locally modified fabric, depending on how the dye affects the unmodified area of the fabric may result in the unmodified areas being of a different shade or of a different color to the modified areas. If one side of the fabric has been coated, the final product is a fabric having sides of different color intensity or of different colors.

Another advantage of the present invention is that the fabrics can be dyed continuously or semi-continuously by fiber-reactive dyes in a neutral bath solution. The impregnation bath solution may be prepared by simple dissolution of the dye in water without further addition of any alkaline ingredient or other. This tends to stabilize and lengthen the life of the bath solution. It suffices to full the fabrics in the bath solution then to evaporate or roll up the pieces and to allow the impregnation bath to act a little while, at a moderate temperature (40°-50°) avoiding any drying, thus migration of the dye. This also constitutes another aspect of the present invention.

The invention is illustrated in the following Examples.

Example 1

A cotton fabric more specifically 25 g of 130g/m² cotton poplin, was filled in an aqueous solution containing 1 percent sodium hydroxide and the necessary quantity of epoxypropyl trimethyl ammonium chloride:

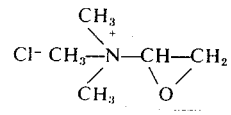

so that the concentration of active product (60 percent), calculated on the epoxy function, was such that a squeezing-out at 100 percent deposited 1 percent nitrogen on the sample. This sample kept at the initial dimensions was treated for 10 minutes at 120°C in a current of hot air.

After rinsing and drying, the cotton fabric had a corrected amount of nitrogen of 0.55 percent, corresponding to a useful yield of the active product of about 55 percent.

The presence of a strong base to catalyse the fixation of the epoxy ammonium salt is absolutely necessary, as test A, which follows, shows. Furthermore, when the operation is effected in a full bath, and not by impregnation followed by a heat treatment to dryness as described above, the fixation yield of the active product is very low as test B shows.

Test A

A sample of bleached 130g/m² cotton poplin was treated in a full bath in an aqueous solution with 5% epoxypropyl trimethyl ammonium chloride not containing any fixation catalyst: the ratio of the bath was 1/35. The whole was kept for 8 hours at 50°C avoiding the evaporation of the bath. After rinsing and drying the sample has a content of nitrogen practically identical with that of the untreated fabric i.e. 0.02 percent. There is, therefore, no reaction in the conditions of the test.

The sample is not dyed by CI Reactive Red 5 in a neutral medium or by CI Acid Blue 47 (CI 62085).

Test B

The test in the full bath was repeated with an aqueous solution containing 1 percent sodium hyroxide and 5 percent epoxypropyl trimethyl ammonium chloride.

After rinsing and drying, the cotton fabric had a corrected amount of nitrogen of 0.21 percent, which corresponds to a useful yield of the active product of only 18 percent.

Example 2

The process according to Example 1 was repeated, except that the treatment temperature was 100°C instead of 120°C. The useful yield of the active product was 48 percent.

Example 3

A cotton fabric was treated in the conditions given in Example 1, but the active product is epoxypropyl diethylmethyl ammonium methyl sulphate:

$$CH_3-SO_4^- \quad C_2H_5-\overset{\overset{C_2H_5}{+}}{\underset{CH_3}{N}}-CH_2-\underset{O}{CH-CH_2}$$

The fixation yield of the deposited nitrogen was 80 percent.

Example 4

The test of Example 3 was repeated but varying the concentration of the active product in such a manner that the amount of deposited nitrogen was 0.5 percent. The fixation yield of the active product was then 90 percent.

Example 5

In the conditions of test 1, but using as salt of quaternary ammonium epoxypropyl diethylmethyl ammonium iodide:

$$I^- \quad C_2H_5-\overset{\overset{C_2H_5}{+}}{\underset{CH_3}{N}}-CH_2-\underset{O}{CH-CH_2}$$

The fixation yield was 80 percent.

Example 6

A cotton fabric treated in the conditions of Example 1, with an amount of fixed nitrogen of 0.4 percent, was dyed in CI Direct Red 81 (CI 28160). It was ascertained that 1 percent of the dye gave the same intensity of tone as 3 percent on the untreated fabric. The firmness indices to water, checked in accordance with the E.C.E. code were as follows:
  Deterioration 4 – 5
  Scouring on cotton 4 – 5
while for the untreated fabric, these indices were
  Deterioration 2 – 3
  Scouring on cotton 1.

Example 7

Samples of cotton fabric treated in the conditions of Example 1 with an amount of fixed nitrogen of 0.4 percent were dyed in neutral aqueous solutions of fibro-reactive dyes (2 percent of CI Reactive Red 5 and CI Reactive Blue 4). After 15 minutes of dyeing at ambient temperature, then at a temperature increasing from 25° to 60° in 30 minutes, the samples came out with an intensity of tone corresponding to the shade necessitating at least 4 percent of dye on fabric not modified in the usual dyeing conditions. A control fabric put into the same baths came out barely dyed.

The dyeings obtained did not show any appreciable variation in firmness on relation to standard dyeings, with the same dyes, at the same height of tone on unmodified cotton fabric.

Example 8

Samples of fabrics of cotton and of polynosic fibers were treated in the conditions of Example 1 with an amount of fixed nitrogen of 0.3 percent. They were then dyed by means of the following dyes:
  CI Direct Red 117 (CI 28230)
  CI Acid Blue 47 (CI 62085)
  CI Acid Orange 121
  CI Mordant Blue 77.

It was ascertained that the affinity for these dyes was very high, while the non-modified cotton exhibits little or no affinity for the same dyes.

Example 9

The conditions of Example 4 were used to treat a fabric of acetalysed polyvinyl alcohol fibers (Vinylal). The fixation yield was only 25 percent.

The final fabric containing 0.125 percent of fixed nitrogen proved to possess a very increased affinity for direct dyes, acid dyes, metalliferous 2/1 complexes and fiber-reactive dyes in a neutral medium.

Example 10

A cotton fabric was treated in the conditions given in Example 1 with an amount of fixed nitrogen of 0.5 percent. After treatment, this fabric was acetalysed in heterogenous phase by a known process, until an amount of combined acetic acid of 55 percent.

The resulting samples of fabric could be dyed by the following dyes after a pre-soaking in a 50/50 mixture of acetone/water:
  CI Reactive 5
  CI Reactive Blue 4 (See Chemical Abstracts, Vol. 68, 1968, pages 968S, and Vol. 67, 1967, 100984, as well as U. S. Pat. No. 3,133,921 showing synthesis of the dye.)
  CI Disperse Blue I (CI 64500)
  CI Acid Orange 121
  CI Acid Blue 47 (CI 62085)
  CI Mordant Blue 77
  CI Direct Blue 71 (CI 34140)

Example 11

A paste of linters having a degree of polymerisation of 865 was first treated in accordance with the process of Example 3 then acetylised in accordance with a known process in homogenous phase in a medium of methylene chloride. After precipitation by petroleum ether and washing there was obtained a product having the following characteristics:
  Amount of nitrogen 0.4%
  Amount of combined acetic acid 58.6%
  Intrinsic viscosity in meta-cresol 2.07 ml/g
  Soluble in methylene chloride, chloroform, Symmetrical tetrachloroethane, acetic acid, and meta-cresol.

Starting from a solution in methylene chloride containing 10 percent ethyl alcohol, it was possible to manufacture films and fibers. These products could be dyed with the same dyes as listed in Example 10 above, according to the same process.

Example 12

Two fabrics manufactured starting from two samples of cotton of the Detapine variety, one with a good maturity and the other of very low ripeness, were treated in the conditions of Example 1, but with an amount of fixed nitrogen of 0.3 percent.

Samples of treated and untreated fabrics placed end to end were dyed on a Jigger in CI Azoic Coupling Component 8 (CI 37525)/CI Azoic Diazo Component II (CI 37085) and in micro powder
CI Vat Blue 4 (CI 69800)

In the two cases it was ascertained that the treated fabric had a distinctly increased affinity: thus, the cotton fabric of very low ripeness, treated, dyes in a shade of deeper color than the cotton fabric of good ripeness, not treated.

Furthermore, the bad finish of the fabrics of low maturity, which bad finish is due to the presence of numerous "buttons" of "dead cotton" standing out more clearly after dyeing, is found to be distinctly improved by the treatment in accordance with the invention.

Example 13

In this Example, instead of using an epoxy ammonium salt as in the preceding Examples, there was used the corresponding chlorohydrin considered as the precursor of epoxy ammonium. In these conditions it is necessary to add to the sodium hydroxide at 1% an additional quantity of NaOH to neutralise the chlorine of the chlorohydrin. Operating by impregnation and heat treatment to dryness, there are obtained fixation yields comparable with those obtained with the epoxy ammonium salts.

A sample of cotton poplin of 130 g/m² was fulled in an aqueous solution containing 2 percent sodium hydroxide and 6 percent (chloro - 3 hydroxy-2) - propyl trimethyl ammonium chloride

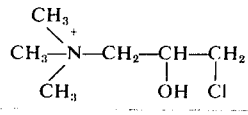

and squeezed out to a dryness of 100 percent.

The sample kept at the initial dimensions was treated for 10 minutes at 120°C in a current of hot air.

After rinsing and drying, the cotton fabric had a corrected amount of nitrogen of 0.22 percent, which corresponds to a useful yield of the ammonium of about 55 percent.

The treated fabric is strongly dyed by CI Reactive Red 5 in a neutral medium or by CI Acid Blue 47 (CI 62085).

What we claim is:

1. A process for treating and dyeing textiles of cellulose, regenerated cellulose or insolubilised polyvinyl alcohol, each having free hydroxy groups, to modify its dyeing properties, particularly its affinity for fiber reactive dyes, which process comprises:

a. impregnating the cellulose, regenerated cellulose or insolubilised polyvinyl alcohol with an aqueous solution of an epoxypropyl ammonium salt selected from the group consisting of epoxypropyl trimethyl ammonium chloride, epoxypropyl diethylmethyl ammonium methyl sulphate, and epoxypropyl diethylmethyl ammonium iodide, and precursors thereof, at a predetermined concentration to obtain a nitrogen concentration of about 0.1 to 0.5 percent by weight of the final product, wherein said aqueous solution contains a strong mineral base as a fixation catalyst at a concentration of about 0.5 to 10 percent by weight;

b. removing excess water from the impregnated cellulose, regenerated cellulose or insolubilised polyvinyl alcohol;

c. drying the impregnated product to complete dryness at from 80°C. to 140°C.;

d. rinsing the totally dried product with water; this combination of steps causing the epoxypropyl ammonium salt to be chemically affixed directly to the cellulose, regenerated cellulose or insolubilised polyvinyl alcohol at the level of the free hydroxy groups thereof; and e. subsequently dyeing the fibers with a fiber-reactive dye.

2. A fabric dyed according to the process of claim 1.

* * * * *